(12) United States Patent
Chandrasekaran et al.

(10) Patent No.: US 12,166,645 B2
(45) Date of Patent: Dec. 10, 2024

(54) HOSTNAME BASED MANAGEMENT OF FEATURES OF A NETWORK DEVICE

(71) Applicant: ARRIS Enterprises LLC, Suwanee, GA (US)

(72) Inventors: Sathish Arumugam Chandrasekaran, Bangalore (IN); Muralidharan Narayanan, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 46 days.

(21) Appl. No.: 17/512,866

(22) Filed: Oct. 28, 2021

(65) Prior Publication Data
US 2022/0158909 A1    May 19, 2022

Related U.S. Application Data

(60) Provisional application No. 63/113,513, filed on Nov. 13, 2020.

(51) Int. Cl.
*H04L 41/22* (2022.01)
*G06F 3/0482* (2013.01)
*H04L 61/45* (2022.01)

(52) U.S. Cl.
CPC .......... *H04L 41/22* (2013.01); *G06F 3/0482* (2013.01); *H04L 61/45* (2022.05)

(58) Field of Classification Search
None
See application file for complete search history.

(56) References Cited

U.S. PATENT DOCUMENTS

| | | | | |
|---|---|---|---|---|
| 5,432,932 A | * | 7/1995 | Chen | G06F 11/32 715/965 |
| 6,249,813 B1 | * | 6/2001 | Campion | H04L 69/22 709/222 |
| 6,538,669 B1 | * | 3/2003 | Lagueux, Jr. | G06F 3/0601 711/170 |
| 8,645,509 B2 | * | 2/2014 | Carriere | H04L 12/4641 370/254 |

(Continued)

OTHER PUBLICATIONS

How to Change Host Name on Ubuntu 20.04 (Jan. 27, 2021, by Ayesha Sajid)—https://linuxways.net/ubuntu/how-to-change-host-name-on-ubuntu-20-04 (Year: 2021).*

(Continued)

*Primary Examiner* — Matthew Ell
*Assistant Examiner* — Koorosh Nehchiri
(74) *Attorney, Agent, or Firm* — Wenderoth, Lind & Ponack, L.L.P.

(57) ABSTRACT

A client device uses a hostname-based feature mapping table. A randomized MAC address and a hostname of the client device is obtained from the memory of the client device. A user interface receives a selection. to indicate the hostname is to be changed to a new hostname. The client device is associated with a network access device when the new hostname is determined to be unique. A list of features and associated rules are displayed in the user interface for associating with the new hostname. Features and associated rules are selected from the list to link to the new hostname. A feature mapping table is presented in the user interface to show the features and associated rules linked to the new hostname.

20 Claims, 5 Drawing Sheets

(56) References Cited

U.S. PATENT DOCUMENTS

| | | | |
|---|---|---|---|
| 9,930,009 B2* | 3/2018 | Adrangi | H04L 61/2596 |
| 10,530,745 B2* | 1/2020 | Erb | H04L 61/58 |
| 11,120,010 B1* | 9/2021 | Landivar | H04L 41/0893 |
| 11,483,283 B1* | 10/2022 | Choukir | H04W 8/005 |
| 2004/0148398 A1* | 7/2004 | Park | H04L 61/5046 |
| | | | 709/227 |
| 2008/0175246 A1* | 7/2008 | Kunhappan | H04L 69/32 |
| | | | 370/392 |
| 2011/0231523 A1* | 9/2011 | Haugland | H04L 67/51 |
| | | | 709/219 |
| 2012/0213211 A1* | 8/2012 | Remaker | H04L 63/0421 |
| | | | 370/338 |
| 2016/0080322 A1* | 3/2016 | Prisser | H04L 63/102 |
| | | | 726/1 |
| 2016/0302058 A1* | 10/2016 | Mestanov | H04L 61/5076 |
| 2019/0007455 A1* | 1/2019 | Sheng | H04L 63/1416 |
| 2019/0109813 A1* | 4/2019 | Newton | H04L 61/5007 |
| 2020/0351648 A1* | 11/2020 | Fang | H04L 63/0421 |

OTHER PUBLICATIONS

MacOS Catalina10.15 User Guide—Change your computer's name or local hostname on Mac page, (https://web.archive.org/web/20200501160729/https://support.apple.com/guide/mac-help/change-computers-local-hostname-mac-mchlp2322/mac) (Year: 2020).*

\* cited by examiner

HOSTNAME BASED MANAGEMENT OF FEATURES OF A NETWORK DEVICE

BACKGROUND

The subject matter of the present disclosure relates generally to hostname-based feature mapping table. The hostname-based feature mapping table uses a unique hostname rather than a MAC address to identify the client device. The unique hostname for a client device is mapped to features and associated rules of a network access device, such as a gateway, a router, an access point, smart media device (SMD), etc.

MAC addresses until recently has been considered a unique & unambiguous address to identify a device. However, the use of MAC address randomization is meant to obscure mobile devices and increase their privacy. MAC address randomization uses a random, anonymous device identifier instead of the real address when connecting to wireless networks. When MAC address randomization is enabled, rules created with the current MAC address of a client device will not be valid as a unique and unambiguous address to identify the client device because the MAC address may automatically change.

SUMMARY

An aspect of the present disclosure involves a hostname-based feature mapping table that uses a unique hostname rather than a MAC address to identify the client device. The unique hostname for a client device is mapped to features and associated rules of a network access device, such as a gateway, a router, an access point, SMD, etc.

A client device for managing features of a network device using a hostname-based feature mapping table includes a memory storing computer-readable instructions, and a processor configured to execute the computer-readable instructions to obtain a randomized MAC address and a hostname of the client device from memory, receive, in a user interface, a first selection of a hostname change button to indicate changing to a new hostname for identifying the client device, receive entry of the new hostname in a hostname input window in the user interface, and associate with a network access device based on the new hostname being determined to be unique.

The processor is further configured to display, in the user interface, a list of features and associated rules window to associate with the new hostname of the client device, receive a first identification from the list at least one first feature and associated rule to link to the new hostname of the client device, and present, in the user interface, a feature mapping table showing the at least one first feature and associated rule linked to the new hostname of the client device. The processor is also configured to receive input at a send button in the user interface to send to the network access device the feature mapping table associating the new hostname with the at least one first feature and associated rule linked to the new hostname of the client device.

The processor of the client device sends the feature mapping table associating the hostname with the at least one selected first features to the network access device via a Local Communication Agent (LCA). The processor is further configured to receive a second identification from the list at least one second feature and associated rule to link to the new hostname of the client device and present, in the user interface, the feature mapping table showing the at least one first feature and associated rule linked to the new hostname of the client device and the at least one second feature and associated rule linked to the new hostname of the client device. The processor is also further configured to receive an indication from the network access device that the new hostname of the client device is not unique, receive, in the user interface, a second selection of the hostname change button to indicate changing to a different hostname for identifying the client device, receive entry of the different hostname in the hostname input window in the user interface and associate the client device with the network access device based on the different hostname of the client device being determined to be unique. The processor is also further configured to display, in the user interface, the list of features and associated rules window to associate with the different hostname of the client device, receive selection of one or more features and associated rules from the list to link to the different hostname of the client device, present, in the user interface, the feature mapping table showing the one or more features and rules linked to the different hostname of the client device, and receive input at a send button in the user interface to send to the network access device the feature mapping table associating the different hostname with the one or more features and associated rules linked to the different hostname of the client device.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings.

DETAILED DESCRIPTION

While implementations are described herein by way of example, those skilled in the art will recognize that the implementations are not limited to the examples or figures described. It is understood that the figures and detailed description thereto are not intended to limit implementations to the particular form disclosed but, on the contrary, the intention is to cover modifications, equivalents, and alternatives falling within the spirit and scope as defined by the appended claims. The headings used herein are for organizational purposes and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

Aspects of the present disclosure are directed to a hostname-based feature mapping table. The hostname-based feature mapping table uses a unique hostname rather than a MAC address to identify the client device. The unique hostname for a client device is mapped to features and associated rules of a network access device, such as a gateway, a router, an access point, SMD, etc.

Figure 1:
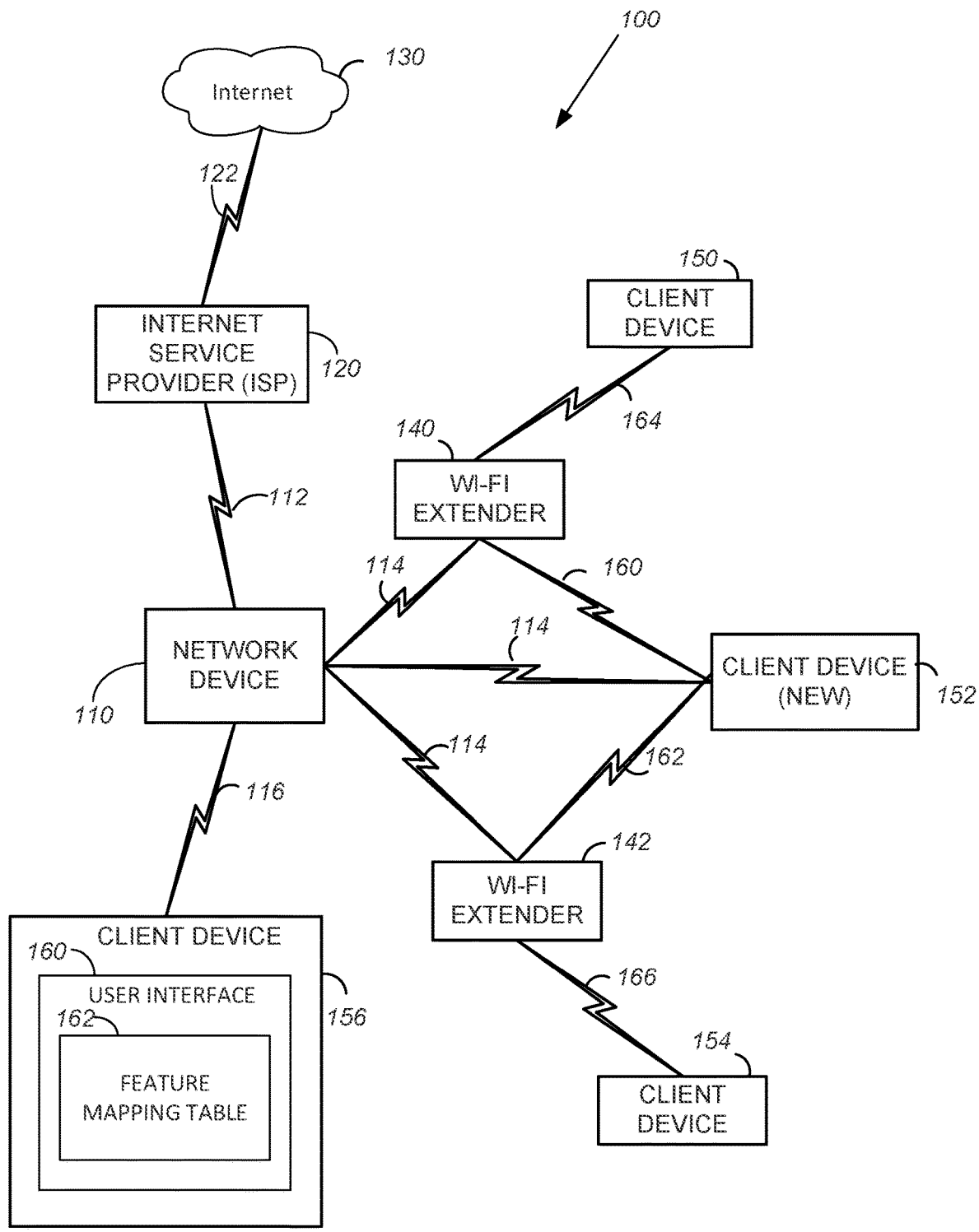
FIG. 1 is a schematic diagram of a system.

FIG. 1 is a schematic diagram of a system 100.

As shown in FIG. 1, the elements of the system 100 include a Network Access Device 110 connected to the Internet 130 via an Internet Service Provider (ISP) 120 and also connected to different wireless devices such as Wireless Extenders 140, 142 and Client Devices 152, 156, while Wireless Extenders 140, 142 are connected to Client Devices 150, 152, 154. Client devices 150, 152, 154 may, for example, be a desktop computer, a laptop computer, an electronic tablet device, a smart phone, an appliance, or any other so-called Internet of Things equipped device that is equipped to communicate information via WLAN. The system 100 shown in FIG. 1 includes wireless devices (e.g., Wireless Extenders 140, 142 and Client Devices 150, 152, 154, 156) that may be connected in one or more wireless networks (e.g., private, guest, iControl, backhaul network, or Internet of things (IoT) network) within the system 100. Additionally, there could be some overlap between wireless devices (e.g., wireless extenders 140, 142 and Client Devices 150, 152, 154, 156) in the different networks. That is, one or more network access devices 100 could be located in more than one network. For example, the wireless extenders 140, 142 could be located both in a private network for providing content and information to Client Devices 150, 152, 154, 156 and also included in a backhaul network or an iControl network.

Starting from the top of FIG. 1, the ISP 120 can be, for example, a streaming video provider or any computer for connecting the Network Access Device 110 to the Internet 130. The connection 122 between the Internet 130 and the ISP 120 and the connection 112 between the ISP 120 and the Network Access Device 110 can be implemented using a wide area network (WAN), a virtual private network (VPN), metropolitan area networks (MANs), system area networks (SANs), a DOCSIS (Data Over Cable Service Interface Specification) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

Connection 112, 122 can further include as some portion thereof a broadband mobile phone network connection, an optical network connection, or other similar connections. For example, the connection 112 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 112 is capable of providing connections between the Network Access Device 110 and a WAN, a LAN, a VPN, MANs, personal area networks (PANs), wireless LANs (WLANs), SANs, a DOCSIS network, a fiber optics network (e.g., FTTH, FTTX, or HFC), a PSDN, a global Telex network, or a 2G, 3G, 4G or 5G network, for example.

The Network Access Device 110 can be, for example, a hardware electronic device that may be a combination modem and gateway device which may combine the functions of a modem, an access point, and/or a router for providing content received from the ISP 120 to other devices (e.g., wireless extenders 140, 142 and Client Devices 150, 152, 154, 156) in the system 100. It is also contemplated by the present disclosure that the Network Access Device 110 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The connections 114 116, 160, 162, 164, 166 between the Network Access Device 110, the wireless extenders 140, 142, and Client Devices 150, 152, 154, 156 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, 60 GHz, etc. Connections 114 116, 160, 162, 164, 166 may be a wired connection such as a wired Ethernet connection. Additionally, the connections 114 116, 160, 162, 164, 166 may also be implemented through a WAN, a local area network (LAN), a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example. Connections 114 116, 160, 162, 164, 166 may further be implemented using a wireless connection that operates in accordance with, but is not limited to, Radio Frequency for Consumer Electronics (RF4CE) protocol, ZigBee protocol, Z-Wave protocol, or IEEE 802.15.4 protocol. It is also contemplated by the present disclosure that the connection 114 can include connections to a media over coax (MoCA) network.

The wireless extenders 140, 142 can be, for example, hardware electronic devices such as access points used to extend the wireless network by receiving the signals transmitted by the Network Access Device 110 and rebroadcasting the signals to, for example, Client Devices 150, 152, 154, which may out of range of the Network Access Device 110. The wireless extenders 140, 142 can also receive signals from the Client Devices 150, 152, 154, and rebroadcast the signals to the Network Access Device 110, or other Client Devices 150, 152, 154, 156.

The Client Devices 150, 152, 154, 156 can be, for example, hand-held computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the Network Access Device 110. Additionally, the Client Devices 150, 152, 154, 156, can be a TV, an IP/QAM STB or an SMD that is capable of decoding audio/video content, and playing over over-the-top (OTT) or MSO provided content received through the Network Access Device 110.

Client Device 156, for example, may present a User Interface 160 for displaying a Feature Mapping Table 162 that is used by Network access device 110 for identifying Client Device 156 for managing features of a Network Access Device 110 associated with rules as provided in Feature Mapping Table 162. Client Devices 150, 152, 154 may also include a User Interface 160 for displaying a Feature Mapping Table 162. A MAC address of a Client Device in provided in the Feature Mapping Table 162 for managing the features of the Network Access Device 110 associated with the rules. The User Interface 160 may receive via the user interface a hostname for the Client Device 156. The User Interface 160 of the Client Device 156 may receive a verification command to verify that the hostname is a unique hostname for the Client Device 156. The Client Device 156 verifies that the hostname provided by the Client Device 156 is a unique hostname.

The Feature Mapping Table 162 is then modified by changing a link of the MAC address to the features associated with the rules for managing the Network Access Device 110 to a link of the unique hostname to the features associated with the rules for managing the Network Access Device 110. The Network Access Device 110 is provided, by the Client Device 156, the Feature Mapping Table 162 after the change with the unique hostname mapped to the features associated with the rules of the Network Access Device 110. A feature management command, received by the User Interface 160 of the Client Device 156, is sent to the Network Access Device 110 via a Local Communication Agent (LCA) to turn on feature management using the unique hostname of the Client Device 156.

Figure 2:
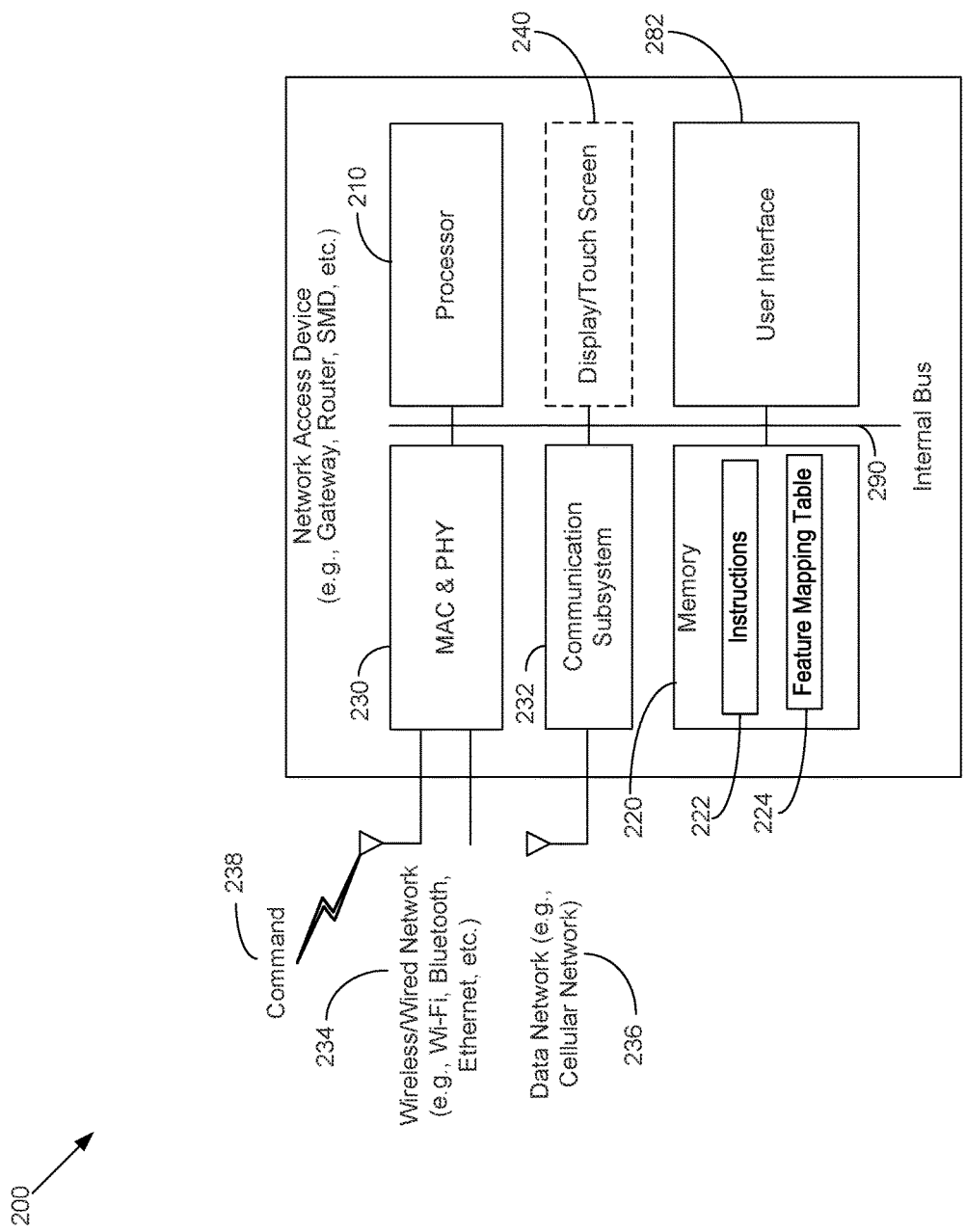
FIG. 2 illustrates a network device.

FIG. 2 illustrates a network device 200.

In FIG. 2, the Network Device 200 may be a gateway, a router, an access point, SMD, etc. Network Access Device 200 may include a Processor 210, Memory 220, a Media Access Controller (MAC) and Physical Transceiver (PHY) 230, Communications System 232, and User Interface, and optionally a Display/Touch Screen 240. Media access controller (MAC) and physical transceiver (PHY) 230 provides wireless and wired communication with an Internet Protocol (IP) network, such as a Wi-Fi network. Communication Subsystem 232 provides communication with a Data Network 236, such as a cellular network. Not all Network Devices 200 include display/touch screen 240. However, some Network Devices 200 may allow control, management, or configuration through a web browser via User Interface 282 instead of Display/Touch Screen 240.

Memory 220 includes Instructions 222 that may be used by Processor 210 to implement functions of the Network Device 200. Memory 220 may also store a Feature Mapping Table 224 that is used to control management of features of the Network Access Device 200. Processor 210 may be configured to execute instructions 224 stored on said Memory 220 to cause said Network Access Device 200 to, for example, Wireless/Wired Network Communication 234 (such as Wi-Fi, Bluetooth, Ethernet, etc.) via Media Access Controller (MAC) and Physical Transceiver (PHY) 230 and communications via Data Network 236 using Communication Subsystem 232. Communication between the components (e.g., 210, 220, 230, 232, 240, 282) of the Network Access Device 200 may be established using an Internal Bus 290.

Certain subject matter of the present disclosure is described herein as including logic or a number of components, units, elements, or mechanisms. The Network Access Device 200 may constitute either software elements (e.g., code embodied on a machine-readable medium) or hardware elements. A "hardware element" is a tangible unit capable of performing certain operations and may be configured or arranged in a certain physical manner. In various examples, one or more computer systems (e.g., a standalone computer system, a client computer system, or a server computer system) or one or more hardware elements of a computer system (e.g., a processor or a group of processors) may be configured by software (e.g., an application or application portion) as a hardware element that operates to perform certain operations as described herein.

Processor 210 may be configured to execute computer-readable instructions maintained in Memory 220 to send/receive a Command 238, for example via Wireless/Wired Network Communication 234, to/from client devices in a network to establish the Feature Mapping Table 224 that is used by Network Device 200 to manage the features of the Network Device 200 based on unique hostnames instead of MAC addresses.

Figure 3:
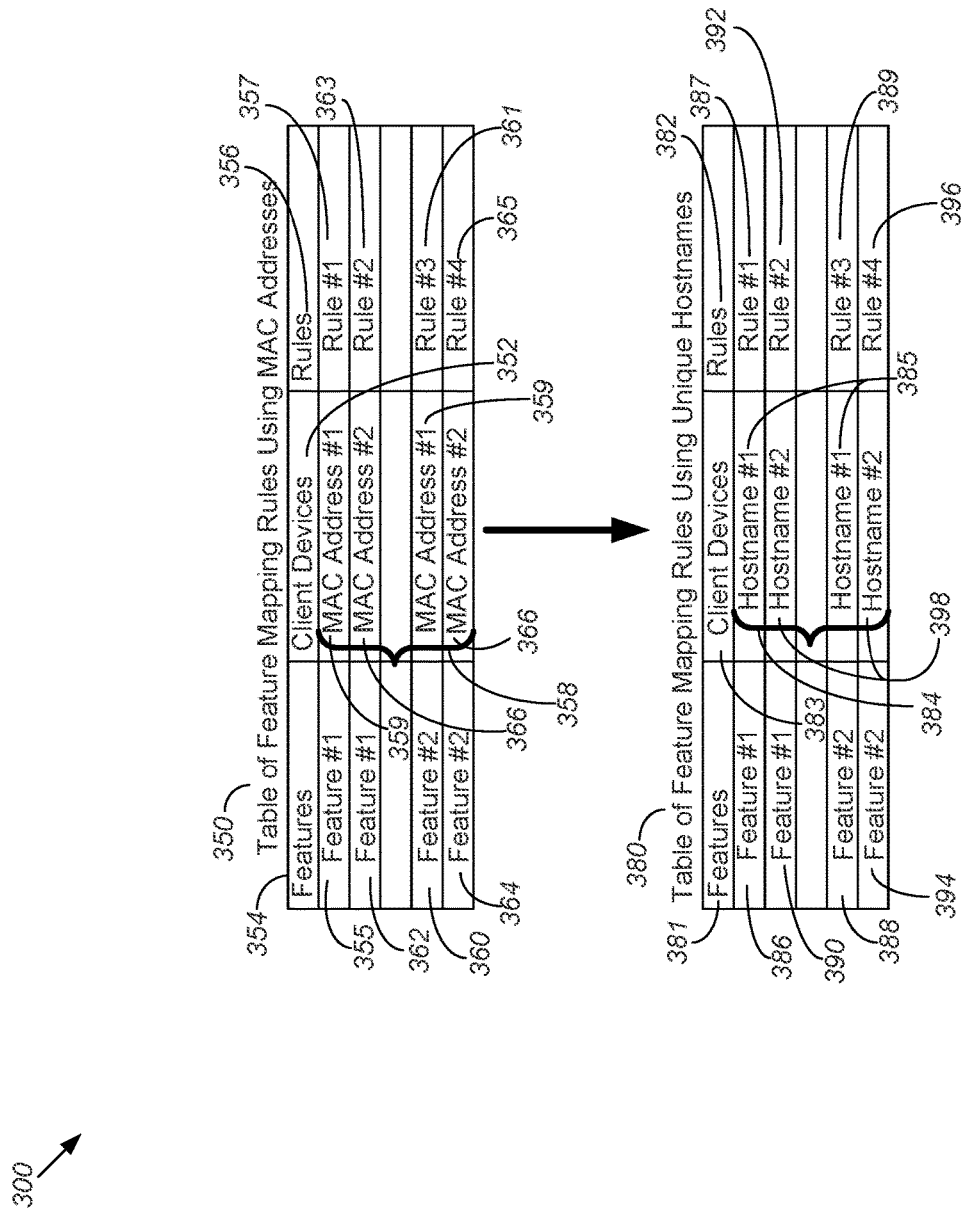
FIG. 3 illustrates tables showing the mapping of features/rules associated with a MAC Address to Hostnames.

FIG. 3 illustrates tables 300 showing the mapping of features/rules associated with a MAC Address to Hostnames.

In FIG. 3, Feature Mapping Tables 350, 380 identify features associated with rules. A network access device stores the information in Feature Mapping Tables 350, 380 for use in identifying client devices 352, 383, and providing the Features 354, 381 according to Rules 356, 382. Client devices 352, 383 are identified by MAC addresses 358 and Hostnames 384. However, when MAC address randomization is enabled for client devices, Features 354 and Rules 356 created with the current MAC address 358 will not be valid as a unique and unambiguous address to identify the client devices because the MAC address changes automatically. Thus, a user interface enables the client devices to select Features 481 and Rules 482 to associated with a Hostname 384.

As shown in FIG. 3, Feature Mapping Table 350 maps Client Devices 352 to Features 354 with associated Rules 356 according to MAC Addresses 358. MAC (Media Access Control) addresses 366 are a 48-bit identification numbers that are assigned to the network interface card that resides in a piece of networking equipment. MAC addresses 366 are used as identification numbers for networking devices, and network switches use MAC addresses 366 to decide how to forward traffic.

When a client device first connects to a network through a gateway device, the user often customizes some of the settings on the client device. Common features of a network device that are dependent on the MAC addresses 366 may include Parental control, Port forwarding, Local Area Network (LAN) IP reservations, associated active/inactive host entries, device priority (QoS), identification of active/inactive devices, receiving and sending notifications, If This Then That (IFTTT) management, security alarms management, Web acceleration and HTTP compression, flow control, encryption, traffic restriction policy enforcement, data compression, TCP performance enhancements (e.g., TCP performance enhancing proxies, such as TCP spoofing), bandwidth usage policing, dynamic load balancing, etc. However, the present disclosure is not meant to be limited to this list.

In Feature Mapping Table 350, Feature 1 355 with associated Rule #1 357 is mapped to a client device having MAC Address #1 359. Feature 2 360 with associated Rule #3 361 is mapped to the client device having MAC Address #1 359 also. Feature #1 362 with associated Rule #2 363 and Feature #2 364 associated with Rule #4 365 are mapped to the client device having MAC Address #2 366.

A network access device may instead use Feature Mapping Table 380 that maps Features 381 and associated Rules 382 to Client Devices 383 based on unique Hostnames 384. In the Internet protocols, names that are given to computing devices are referred to as "hostnames." Hostnames 384 are normally used in conjunction with a domain name suffix to build the Fully Qualified Domain Name (FQDN) of a host. However, it is common practice to use the Hostname 384 without further qualification in a variety of applications from file sharing to network management. Hostnames 384 are typically published as part of domain names and can be obtained through a variety of name lookup and discovery protocols. Hostnames 384 need to be unique within the domain in which they are created and used. However, Hostnames 384 do not have to be globally unique identifiers.

Network access devices that monitor a network, such as a gateway, router, or Wi-Fi hot spot, can obtain hostnames through passive monitoring or active probing through techniques, such as DHCP or Multicast DNS (mDNS). The Hostnames 384 may be correlated with various other information extracted from traffic analysis and other information sources, and Hostnames 384 in Feature Mapping Table 380 identify the device, device properties, and its user.

Naming is generally left to the discretion of the user, and as long as users are careful to not pick a name already in use on the same network, users are largely free to use any name they desire. Very often, however, the operating system suggests a hostname at the time of installation, which can contain the username, the login name, and information learned from the device itself such as the brand, model, or maker of the device. Small devices including, for example, smart phones, tablets, etc., often have manufacturer-assigned names, which vary from generic names like "Windows Phone" to completely unique names like "BrandX-123456-7890-abcdef" and often contain the name of the device owner, the device's brand name, and often also a hint as to which language the device owner speaks.

As will be described in FIG. 4, a user interface enables the client devices to select Features 481 and Rules 482 to associated with a Hostname 384. As shown in FIG. 3, Hostname #1 385 is used to identify a first client device. When the user selects to use Hostname #1 385, Feature Mapping Table 380 is updated to map, for example, Hostname #1 385 to Feature #1 386 associated with Rule #1 387 and to Feature #2 388 associated with Rule #3 389. Feature #1 390 with associated Rule #2 392 and Feature #2 394 associated with Rule #4 396 are mapped to a client device having Hostname #2 398.

Figure 4:
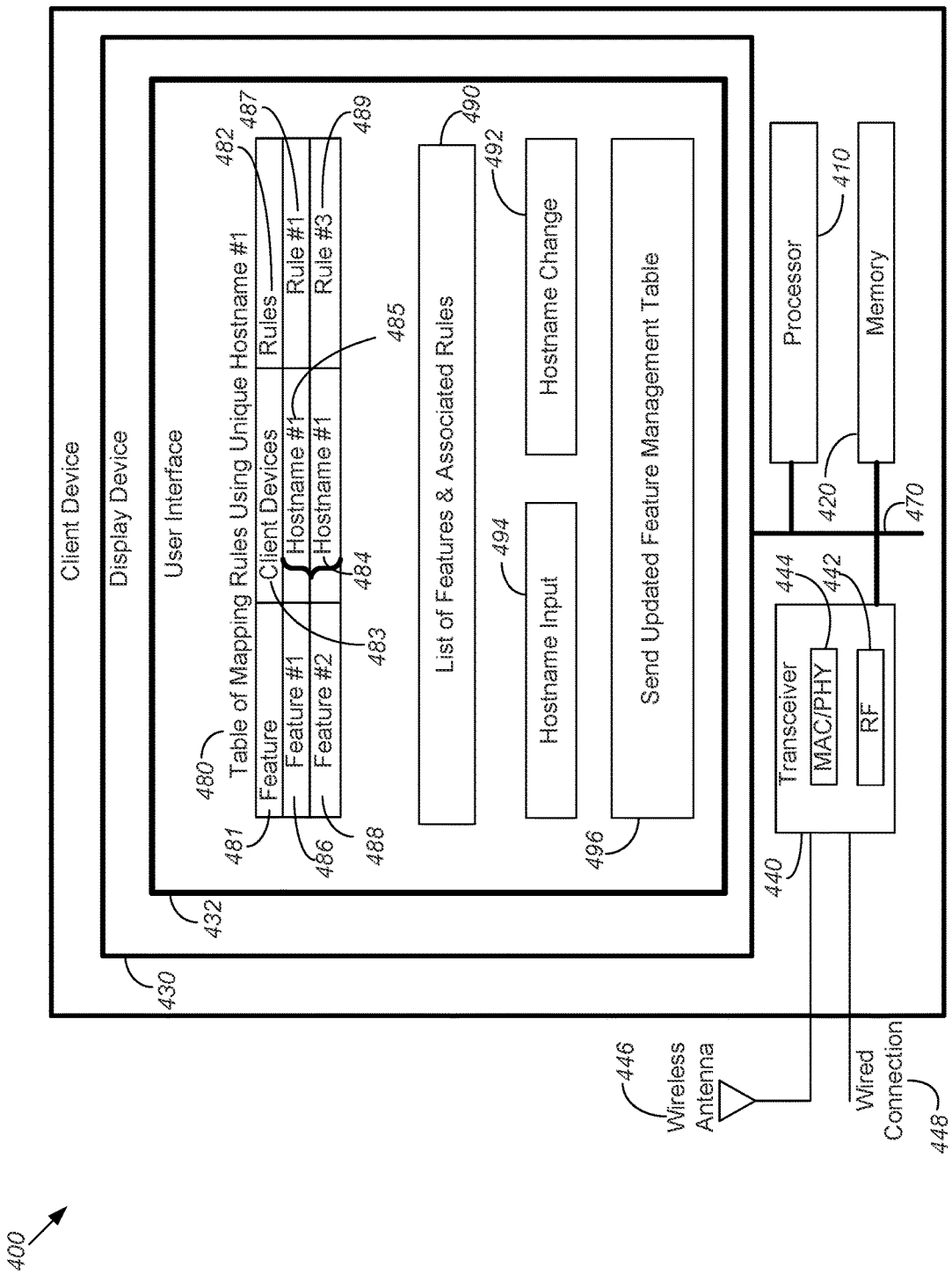
FIG. 4 illustrates a Client Device that uses a hostname-based feature mapping table.

FIG. 4 illustrates a Client Device 400 that uses a hostname-based feature mapping table.

In FIG. 4, Client Device 400 includes a Processor 410, Memory 420, Display Device 430 and Transceiver 440. Transceiver 440 processes received data into a format that Processor 410 may use and prepares data for transmission. Processor 410, Memory 420, Display Device 430, and Transceiver 440 may be coupled by Bus 470. Data may be transmitted and received via Wireless Antenna 446 and Wired Connection 448. Transceiver 440 includes MAC/PHY 442 and RF segment 444. MAC/PHY 442 provides wireless IP network communication (such as Wi-Fi) via Wireless Antenna 446 and wired communication (such as Ethernet or MoCA) via Wired Connection 448. MAC/PHY 442 supports wireless Wi-Fi connections using 2.4 GHz bands, 5 GHz bands, 6 GHz bands, 60 GHz bands, etc. MAC/PHY 442 implements physical layer functions to provide physical access for signals communicated over a wireless link, and controls transmission/receipt of data packets via Wireless Antenna 446 and Wired Connection 448. MAC/PHY 442 implements physical layer functions to provide physical access for signals. RF segment 444 processes signals for RF transmission and received RF signals. Both Wireless Antenna 446 and Wired Connection 448 may be used for RF signals. Thus, Transceiver 440 includes RF processing to support 802.11 Wi-Fi protocols for communication using 2.4 GHz bands, 5 GHz bands, 6 GHz bands, 60 GHz, etc., as well as Ethernet, Cable TV, Satellite services, MoCA, etc.

The Display Device 430 of Client Device 400 may present a User Interface 432. With the introduction of MAC address randomization feature enabled for Client Device 430, the rules created with the current MAC address will not be valid as a unique and unambiguous address to identify the Client Device 400 because the MAC address changes automatically.

The User Interface 432 provides the Client Device 400 the ability to select Features 481 and Rules 482 to associated with a hostname of Client Devices 483. For example, Hostname #1 485 is associate with Feature #1 486 and Rule #1 487. Hostname #1 485 is also associate with Feature #2 488 and Rule #3 489.

Client Device 400 has a hostname and a first MAC address. When Client Device 400 implements MAC randomization, a second MAC address may be provided for Client Device 400. For example, a network access device broadcasts beacon frames at regular intervals. These frames contain (among others) network capabilities and SSID. A SSID is an identification that is broadcast by a network access device to announce the presence of a network access device associated with the SSID. Client Device 400 may also discover a network access device by transmitting probe requests. A network access device within reach of Client Device 400 analyzes the probe request frame to determine the MAC address of the Client Device 400. The network access device responds by sending probe response frames. Probe Response frames allow Client Device 400 to find out everything it needs to begin communications with the network access device, including the SSID and rates supported by the network access device. Client Device 400 performs authentication with the network access device, and then sends an association request to the network acce4ss device. The network access device then transmits an association response to Client Device 400.

MAC addresses until recently have been considered a unique & unambiguous address to identify Client Device 400. However, MAC address randomization may be enabled on Client Device 400. Thus, rules created with the current MAC address of Client Device 400 will not be valid as a unique and unambiguous address to identify Client Device 400 because the MAC address may automatically change. When Client Device 400 attempts to associate with a network access device, the network access device checks to determine if the MAC address of the client device is known to the network. Every time the user of client device connects to the network access device, with the same first MAC address, the custom settings for Client Device 400 are activated. But because MAC randomization is enabled for Client Device 400, the MAC address for the client device changes and a second MAC address is used.

When the Client Device 400 attempts to connect to the network access device using the second MAC address that was set through MAC randomization, the network access device does not provision the custom settings based on the new, second MAC address of Client Device 400 because it cannot find the second MAC address in its records. All of the custom settings that were based on the previous, first MAC address for Client Device 400 are no longer available to the client device.

Another check may be performed by the network access device to see if a hostname, such as Hostname #1 484, 485, of the Client Device 400 is known to the network. If both the MAC address of Client Device 400 and Hostname #1 484, 485 of Client Device 400 are known to the network, Client Device 400 is allowed onto the network as a trusted device, and all the Features 481 and Rules 482 for Client Device 400 are applied.

If the MAC address of the client device is randomized, Client Device 400 is asked to either keep the default hostname or select a new hostname for the device. User Interface 432 receives a selection to Hostname Change button 492. User Interface 432 provides Hostname Input window 494 for entry of the new hostname. The network device tests the new hostname entered in the User Interface 432 of Client Device 400 to make sure that it is not empty or in use by another client device on the network. If the new hostname is empty or in use by another client device on the network, Client Device 400 is asked to select another hostname. If the user selects another hostname via Hostname Input window 494, the hostname is checked again to make sure that it is not empty or in use by another client device that is online.

Once Client Device 400 selects a Hostname 484, such as Hostname #1 484, 485, that is not in use by another client device that is online, Client Device 400 is allowed onto the network as a trusted device, and all the Features 481 and Rules 482 selected from the List Of Features And Associated Rules window 490 for Client Device 400 are applied. By connecting the user's experience on the network to, for example, Hostname #1 484, 485 of Client Device 400, which will not change, instead of to randomized MAC addresses, which do change, the network access device remembers Client Device 400 on the network and provide Features 481 and Rules 482 associated with Hostname #1 484, 485 every time Client Device 400 joins the network.

Client Device 400 does not maintain a mapping of the MAC address to a hostname, such as Hostname #1 484, 485. Once Hostname #1 484, 485 is verified as being unique, the Features 481 and Rules 482 are manage in terms of Hostname #1 484, 485. The User Interface 432 of Client Device 400 allows a user to select Send Updated Feature Management Table button 496 to send the network device via a Local Communication Agent (LCA) command 496 to turn on feature management based on Hostname #1 484, 485 as shown in Feature Mapping Table 480.

Figure 5:
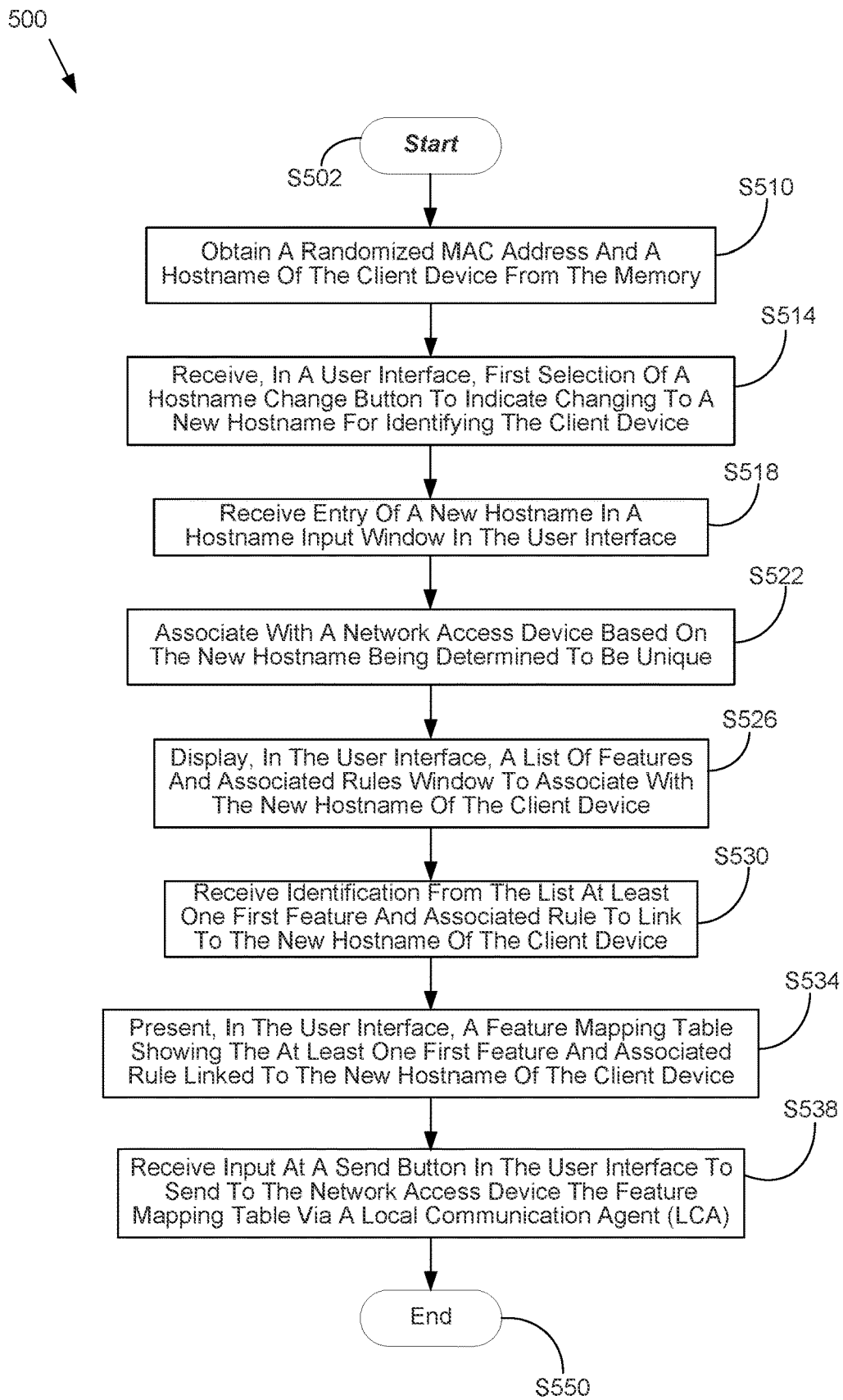
FIG. 5 illustrates a flow chart of a method for providing hostname-based router feature management.

FIG. 5 illustrates a flow chart 500 of a method for providing hostname-based router feature management.

In FIG. 5, method 500 starts (S502), and a randomized MAC address and a hostname of the client device is obtained from the memory (S510). Referring to FIG. 4, Client Device 400 has a hostname and a first MAC address. When Client Device 400 implements MAC randomization, a second MAC address may be provided for Client Device 400.

A first selection of a hostname change button is received in a user interface to indicate changing to a new hostname for identifying the client device (S514). Referring to FIG. 4, if the MAC address of the client device is randomized, Client Device 400 is asked to either keep the default hostname or select a new hostname for the device. User Interface 432 receives a selection to Hostname Change button 492.

Entry of a new hostname is received in a hostname input window in the user interface (S518). Referring again to FIG. 4, User Interface 432 provides Hostname Input window 494 for entry of the new hostname. The network device tests the new hostname entered in the User Interface 432 of Client Device 400 to make sure that it is not empty or in use by another client device on the network. If the new hostname is empty or in use by another client device on the network, Client Device 400 is asked to select another hostname. If the user selects another hostname via Hostname Input window 494, the hostname is checked again to make sure that it is not empty or in use by another client device that is online. Once Client Device 400 selects a Hostname 484, such as Hostname #1 484, 485, that is not in use by another client device that is online, Client Device 400 is allowed onto the network as a trusted device.

A list of features and associated rules window to associate with the new hostname of the client device is displayed in the user interface (S526). Referring to FIG. 4 Features 481 and Rules 482 are selected from the List Of Features And Associated Rules window 490 for Client Device 400.

Identification from the list at least one first feature and associated rule to link to the new hostname of the client device is received (S530). FIG. 4 shows that, by connecting the user's experience on the network to, for example, Hostname #1 484, 485 of Client Device 400, which will not change, instead of to randomized MAC addresses, which do change, the network access device remembers Client Device 400 on the network and provide Features 481 and Rules 482 associated with Hostname #1 484, 485 every time Client Device 400 joins the network.

A feature mapping table showing the at least one first feature and associated rule linked to the new hostname of the client device is presented in the user interface (S534). Referring to FIG. 4, Client Device 400 does not maintain a mapping of the MAC address to a hostname, such as Hostname #1 484, 485. Once Hostname #1 484, 485 is verified as being unique, the Features 481 and Rules 482 are manage in terms of Hostname #1 484, 485.

Input is received at a send button in the user interface to send to the network access device the feature mapping table via A Local Communication Agent (LCA) (S538).

Referring to FIG. 4, the User Interface 432 of Client Device 400 allows a user to select Send Updated Feature Management Table button 496 to send the network device via a Local Communication Agent (LCA) command 496 to turn on feature management based on Hostname #1 484, 485 as shown in Feature Mapping Table 480. The process then ends (S550).

The processes discussed in this disclosure may be implemented in hardware, software, or a combination thereof In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A client device, in a network, for managing features of a networkaccess device using a hostname-based feature mapping table, comprising: a memory storing computer-readable instructions; and a processor configured to execute the computer-readable instructions to:
    obtain a MAC address of the client device and a hostname of the client device from the memory;
    present, in a user interface, a hostname change button, based on the MAC address that is obtained being a randomized MAC address;
    receive, in the user interface, a first selection of the hostname change button to indicate changing to a new hostname for identifying the client device;
    receive entry of the new hostname in a hostname input window in the user interface based on the first selection;
    test that the new hostname is unique by making sure that the new hostname is not empty and not in use by another network device on the network; and
    associate the new hostname with the network access device based on the testing that the new hostname is unique.

2. The client device of claim 1, wherein the processor is further configured to:
    display, in a window of the user interface, one or more features and one or more associated rules to associate with the new hostname of the client device;
    receive a first identification of a selected at least one first feature of the one or more features and at least one associated first rule of the one or more associated rules displayed in the window to link to the new hostname of the client device; and
    present, in the user interface, a feature mapping table showing the at least one first feature and the at least one associated first rule linked to the new hostname of the client device.

3. The client device of claim 2, wherein the processor is further configured to:
    receive input at a send button in the user interface to send to the network access device the feature mapping table associating the new hostname with the at least one first feature and the at least one associated first rule linked to the new hostname of the client device.

4. The client device of claim 3, wherein the processor sends, to the network access device, the feature mapping table associating the new hostname with the at least one first feature by sending the feature mapping table associating the hostname with the at least one first features to the network access device via a Local Communication Agent (LCA).

5. The client device of claim 2, wherein the processor is further configured to:
    receive a second identification of a selected at least one second feature of the one or more features and at least one associated second rule of the one or more associated rules displayed in the window to link to the new hostname of the client device; and
    present, in the user interface, the feature mapping table showing the at least one first feature and the at least one associated first rule linked to the new hostname of the client device and the at least one second feature and the at least one associated second rule linked to the new hostname of the client device.

6. The client device of claim 2, wherein the processor is further configured to:
    receive an indication from the network access device that the new hostname of the client device is not unique;
    receive, in the user interface, a second selection of the hostname change button to indicate changing to a different hostname for identifying the client device;
    receive entry of the different hostname in the hostname input window in the user interface based on the second selection; and
    associate the client device with the network access device based on the different hostname of the client device being determined to be unique.

7. The client device of claim 6, wherein the processor is further configured to:
    display, in the window of the user interface, the one or more features and the one or more associated rules to associate with the different hostname of the client device;
    receive selection of at least one third feature of the one or more features and at least one associated third rule of the one or more associated rules to link to the different hostname of the client device;
    present, in the user interface, the feature mapping table showing the at least one third feature and the at least one associated third rule linked to the different hostname of the client device; and
    receive input at a send button in the user interface to send to the network access device the feature mapping table associating the different hostname with the at least one third feature and the at least one associated third rule linked to the different hostname of the client device.

8. A method for managing features of a network access device using a hostname-based feature mapping table, comprising:
    obtaining a MAC address of the client device and a hostname of the client device from the memory;
    presenting, in a user interface, a hostname change button, based on the MAC address that is obtained being a randomized MAC address;
    receiving, in the user interface, a first selection of the hostname change button to indicate changing to a new hostname for identifying the client device;

receiving entry of the new hostname in a hostname input window in the user interface based on the first selection;

testing that the new hostname is unique by making sure that the new hostname is not empty and not in use by another network device on the network; and associating the new hostname with the network access device based on the testing that the new hostname is unique.

9. The method of claim 8 further comprising:

displaying, in a window of the user interface, one or more features and one or more associated rules to associate with the new hostname of the client device;

receiving a first identification of a selected at least one first feature of the one or more features and at least one associated first rule of the one or more associated rules displayed in the window to link to the new hostname of the client device; and presenting, in the user interface, a feature mapping table showing the at least one first feature and the at least one associated first rule linked to the new hostname of the client device.

10. The method of claim 9 further comprising:

receiving input at a send button in the user interface to send to the network access device the feature mapping table associating the new hostname with the at least one first feature and the at least one associated first rule linked to the new hostname of the client device.

11. The method of claim 10, wherein the feature mapping table associating the new hostname with the selected at least one first feature is sent by sending the feature mapping table associating the hostname with the at least one first feature to the network access device via a Local Communication Agent (LCA).

12. The method of claim 9 further comprising:

receiving a second identification of a selected at least one second feature of the one or more features and at least one associated second rule of the one or more associated rules displayed in the window to link to the new hostname of the client device; and presenting, in the user interface, the feature mapping table showing the at least one first feature and the at least one associated first rule linked to the new hostname of the client device and the at least one second feature and the at least one associated second rule linked to the new hostname of the client device.

13. The method of claim 9 further comprising:

receiving an indication from the network access device that the new hostname of the client device is not unique;

receiving, in the user interface, a second selection of the hostname change button to indicate changing to a different hostname for identifying the client device;

receiving entry of the different hostname in the hostname input window in the user interface based on the second selection; and associating the client device with the network access device based on the different hostname of the client device being determined to be unique.

14. The method of claim 13 further comprising:

displaying, in the window of the user interface, the one or more features and the one or more associated rules to associate with the different hostname of the client device;

receiving selection of at least one third feature of the one or more features and at least one associated third rule of the one or more associated rules to link to the different hostname of the client device;

presenting, in the user interface, the feature mapping table showing the at least one third feature and the at least one associated third rule linked to the different hostname of the client device; and receiving input at a send button in the user interface to send to the network access device the feature mapping table associating the different hostname with the at least one third feature and the at least one associated third rule linked to the different hostname of the client device.

15. A non-transitory computer-readable media having computer-readable instructions stored thereon, which when executed by a processor causes the processor to perform operations comprising:

obtaining a MAC address of the client device and a hostname of the client device from the memory;

presenting, in a user interface, a hostname change button, based on the MAC address that is obtained being a randomized MAC address;

receiving, in the user interface, a first selection of the hostname change button to indicate changing to a new hostname for identifying the client device;

receiving entry of the new hostname in a hostname input window in the user interface based on the first selection;

testing that the new hostname is unique by making sure that the new hostname is not empty and not in use by another network device on the network; and associating the new hostname with the network access device based on the testing that the new hostname is unique.

16. The non-transitory computer-readable media of claim 15 further comprising displaying, in a window of the user interface, one or more features and one or more associated rules window to associate with the new hostname of the client device;

receiving a first identification of a selected at least one first feature of the one or more features and at least one associated first rule of the one or more associated rule rules to link to the new hostname of the client device; and presenting, in the user interface, a feature mapping table showing the at least one first feature and the at least one associated first rule linked to the new hostname of the client device.

17. The non-transitory computer-readable media of claim 16 further comprising:

receiving input at a send button in the user interface to send to the network access device the feature mapping table associating the new hostname with the at least one first feature and the at least one associated first rule linked to the new hostname of the client device.

18. The non-transitory computer-readable media of claim 17, wherein the feature mapping table associating the new hostname with the selected at least one first feature is sent by sending the feature mapping table associating. The hostname with the at least one first feature to the network access device via a Local Communication Agent (LCA).

19. The non-transitory computer-readable media of claim 16 further comprising:

receiving a second identification of a selected at least one second feature of the one or more features and at least one associated second rule of the one or more associated rules displayed in the window to link to the new hostname of the client device; and presenting, in the user interface, the feature mapping table showing the at least one first feature and the at least one associated first rule linked to the new hostname of the client device and the at least one second feature and the at least one associated second rule linked to the new hostname of the client device.

20. The non-transitory computer-readable media of claim 16 further comprising:
receiving an indication from the network access device that the new hostname of the client device is not unique;
receiving, in the user interface, a second selection of the hostname change button to indicate changing to a different hostname for identifying the client device;
receiving entry of the different hostname in the hostname input window in the user interface based on the second selection;
associating the client device with the network access device based on the different hostname of the client device being determined to be unique;
displaying, in the window of the user interface, the one or more features and the one or more associated rules to associate with the different hostname of the client device;
receiving selection of at least one third feature of the one or more features and at least one associated third rule of the one or more associated rules to link to the different hostname of the client device;
presenting, in the user interface, the feature mapping table showing the at least one third feature and the at least one associated third rule linked to the different hostname of the client device; and
receiving input at a send button in the user interface to send to the network access device the feature mapping table associating the different hostname with the at least one third feature and the at least one associated third rule linked to the different hostname of the client device.

* * * * *